(12) United States Patent
Osse

(10) Patent No.: US 9,914,834 B2
(45) Date of Patent: Mar. 13, 2018

(54) **MELT PROCESSED POLYMER COMPOSITION DERIVED FROM LEAF SHEATHS OF TREES OF THE GENUS *ARECACEAE***

(71) Applicant: HEMCELL B.V., KE Heinkenszand (NL)

(72) Inventor: Nicolaas Wilhelmus Ladislaus Osse, KE Heinkenszand (NL)

(73) Assignee: HEMCELL B.V., Heinkenszand (NL)

( * ) Notice: Subject to any disclaimer, the term of this patent is extended or adjusted under 35 U.S.C. 154(b) by 88 days.

(21) Appl. No.: 14/434,366

(22) PCT Filed: Oct. 9, 2013

(86) PCT No.: PCT/NL2013/050719
§ 371 (c)(1),
(2) Date: Apr. 8, 2015

(87) PCT Pub. No.: WO2014/084724
PCT Pub. Date: Jun. 5, 2014

(65) Prior Publication Data
US 2015/0267054 A1 Sep. 24, 2015

(30) Foreign Application Priority Data
Oct. 9, 2012 (NL) ..................................... 2009601

(51) Int. Cl.
*C08L 97/02* (2006.01)
*C08L 23/12* (2006.01)
*C08L 67/04* (2006.01)
*C08L 101/00* (2006.01)

(52) U.S. Cl.
CPC ............... *C08L 97/02* (2013.01); *C08L 23/12* (2013.01); *C08L 67/04* (2013.01); *C08L 101/00* (2013.01)

(58) Field of Classification Search
CPC ........ C08L 97/02; C08L 67/04; C08L 101/00; C08L 101/16; C08L 23/12; C08L 23/26
USPC .............................. 428/220; 523/122; 524/15
See application file for complete search history.

(56) References Cited

U.S. PATENT DOCUMENTS

2003/0087994 A1 * 5/2003 Frechette ................. C08J 5/045
524/9

FOREIGN PATENT DOCUMENTS

| CN | 1396199 A | 2/2003 |
| WO | 2004056544 A1 | 7/2004 |

OTHER PUBLICATIONS

Jani, M. et al. "Oil palm empty fruit bunch-polypropylene composites: the effect maleated polypropylene on the mechanical properties." Journal of Oil Palm Research, vol. 18, Dec. 2006 p. 260-271.
International Search Report and Written Opinion dated Feb. 10, 2014, PCT/NL2013/050719.

(Continued)

*Primary Examiner* — Brian Handville
(74) *Attorney, Agent, or Firm* — Casimir Jones, SC

(57) ABSTRACT

The invention relates to a novel polymer as well as to a method for the preparation of a polymer or polymer blend comprising a novel new matrix component, to a method for the preparation of the said first matrix component, to a method for the preparation of an article comprising the said polymer or polymer blend, as well as to an article comprising the said polymer or polymer blend.

20 Claims, 1 Drawing Sheet

(56) References Cited

OTHER PUBLICATIONS

Kalita et al., "A novel energy efficient machine for plate manufacturing from areca palm leaf sheath", Journal of Scientific & Industrial Research, 2008, vol. 67, pp. 807-811.
Rao et al., "Extraction and tensile properties of natural fibers: Vakka, date and bamboo", Composite Structures, Elsevier Science LTD, 2006, vol. 77, No. 3, pp. 288-295.
Muller, Rolf-Joachim, "Biodegradability of Polymers: Regulations and Methods for Testing", Biopolymers Online, 2005, vol. 10, Chap. 12, pp. 365-374.
Arutchelvi J. et al., "Biodegradtion of polyethylene and polypropylene", Indian Journal of Biotechnology, 2008, vol. 7, pp. 9-22.
Raisanen T. et al., "Basic Chemical Composition of the Biomass Components of Pine, Spruce and Birch", Forest Refine, 2013, pp. 1-4.
Kumar et al., "A Study of Short Areca Fiber Reinforced PF Composites", Proceedings of the World Congress on Engineering, Londong, WCE 2008, vol. II, pp. 1-6.
Srinivasa C V et al., "Static bending and impact behaviour of areca fibers composites", Materials and Design, London, 2010, vol. 32, No. 4, pp. 2469-2475.
Yu T. et al., "Preparation and properties of short natural fiber reinforced poly(lactic acid) composites", Transactions of Nonferrous Metals Society of China, 2009, vol. 19, pp. s651-s655.

\* cited by examiner

MELT PROCESSED POLYMER COMPOSITION DERIVED FROM LEAF SHEATHS OF TREES OF THE GENUS *ARECACEAE*

CROSS REFERENCE TO RELATED APPLICATIONS

The present application is a Section 371 U.S. national stage entry of pending International Patent Application No. PCT/NL2013/050719, International Filing Date Oct. 9, 2013, which claims the benefit of Dutch Patent Application No. 2009601, filed Oct. 9, 2012, the contents of which are incorporated by reference in their entireties.

The invention relates to a novel polymer, to a method for the preparation of the polymer, to articles comprising the said polymer, to a method for the preparation of such articles, to pellets and a method for the preparation thereof, in particular for use in the preparation of a polymer, in particular the above polymer and to the use of material as a matrix component in the preparation of the polymer material.

In the art, biological polymeric matrix components are known, such as polylactic acid (PLA) and polyhydroxyalkanoates (PHA). The term "matrix component" as used herein relates to compounds that are capable of forming a polymeric structure. These compounds form the matrix of a polymer. Such a matrix can also be made by a plurality of such different compounds, resulting in a polymer blend. To this end, additional polymer matrix components can be blended with a first matrix component. In addition to the matrix, polymers may comprise other non-matrix materials, such as reinforcement and filler materials. Such materials do not contribute to the matrix, but are to be regarded as inert components, embedded in the matrix. With the term "biological component" herein is meant that the component is of biological origin, i.e. from animal, plant or microbial origin, preferably of plant origin. The term "biodegradable" herein refers to the definitions from the ASTM subcommittee D20-96 as described in Müller et al. (Biopolymers Online (2005) 10, 365-374), meaning that the said material can be degraded or decomposed by micro-organisms or other biological means in a natural environment, preferably without the addition of additional energy, while forming $CO_2$ and $H_2O$ and biomass. Under anoxic conditions, also $CH_4$ can be formed. Biodegradable material therefore loses weight while being degraded. The faster the weight loss, the better the biodegradability. The biodegradability is determined according to the standard guidelines ASTMD6954-01/04. The term 'polymer matrix component' is intended to reflect components being capable of forming a polymeric matrix in a polymer, i.e. forming the polymeric backbone of the polymer.

According to the above standard, both PLA and PHA are defined as biodegradable polymers, however, the degradation or decomposition thereof requires high temperatures and humidity, which means that the degradation usually takes place in specialized industrial degradation plants at high costs and energy consumption and according to ASTM D6400 standards for industrial bio-degradation. Further, industrially degraded PLA and PHA contaminates existing plastic recycling flows, and these industrially biodegradable plastics have to be separated from traditional carbon based plastics and home compostable materials. Degradation of e.g. a PLA product in nature takes at least around 1 year to several years, so that such articles are still capable of environmental pollution.

The present invention provides an improved polymer as compared with those of the state of the art.

According to the invention, a novel polymer is provided, comprising as a first polymer matrix component, material derived from the leave sheaths of trees of the genus Arecaceae, in particular from the the leave sheaths of the betel palm *Areca catechu*.

Areacaceae are common trees in e.g. India. The betel palm tree *Areca catechu* has 7-12 leaves per stem which fall by nature 4 times per year. The leaves are collected in forestry environments or by farmers who grow the betel nut at plantations. The leaves are used e.g. as reinforcement materials, but are mostly regarded as waste and burned. The sheath material is known for the preparation of articles, such as cups, saucers, plates, etcetera, as is described in e.g. WO 2004/056544. To this end, the sheath material, also named shaft material, is wetted and then pressed under steam pressure. However, no polymeric material is described, nor suggested. The term 'leaf sheath' is known in the art, and refers to that part of the leaf, that is in contact with the stem of the tree, extending to the annular joint where the leaf is joined to the tree. When the tree loses its leafs, the sheath loses contact with the stem. The sheath part can e.g. be manually separated from the leaf part. The term 'leaf sheath derived material' is to be understood to include a particulate of the leaf sheaths, e.g. obtained by grinding, which particulate can be further processed e.g. into pellets, as will be discussed below.

It has surprisingly been found that the use of such a matrix component results in advantageous polymeric material that has form stability and is biodegradable under normal natural conditions according to ASTM D6954-01/04 guidelines.

The leaf sheath material of *Areca catechu* comprises, based on the total sheath weight, 30-70 w/w %, in particular 35-65 w/w % hemicellulose and 10-30 w/w % in particular 13-25 w/w % lignin, and is substantially free of cellulose (i.e. less than 5 w/w %, preferably less than 1 w/w %). Without being bound to any theoretical explanation, it is believed that this combination of hemicellulose to lignin ratio and the absence or near absence of cellulose confers the leaf sheath material, in particular that of *Areca catechu*, thermoplastic properties and rendering this material capable of forming a polymeric matrix. Both hemicellulose and lignin are surprisingly to be regarded as compounds capable of forming a polymeric structure or at least contribute thereto. In contrast to cellulose, hemicellulose has rather short branched sugar chains of 500-3000 units, comprising the sugars glucose, xylose, mannose, galactose, rhamnose and arabinose. It is believed that the branched structure of hemicellulose significantly contributes to the capacity of hemicellulose to polymerize from a melt. Cellulose only comprises large linear chains of 7000-15,000 glucose molecules. Cellulose is therefore not capable to polymerize but can be used as filler or reinforcement material.

In an attractive embodiment, the polymer of the invention comprises a second polymer matrix component. It has been found that in known polymers, a significant portion of the matrix component thereof can be replaced by the first polymer matrix component, as defined above, conferring improved qualities to the known polymer, in particular with regard to biodegradability, material strength and flexibility, in particular when the second matrix component comprises a thermoplastic polymer.

The thermoplastic polymer is preferably chosen from the group, consisting of polylactic acid (PLA), polyhydroxyl alkanoates (PHA), polypropylene (PP), polyethylene terephthalate (PET), polyvinylchloride (PVC), polystyrene (PS), polyvinylidene (PV), polycarbonate (PC), acrylonitrile butadiene styrene (ABS), however, any thermoplastic polymer or combination thereof can be used as second polymer matrix component in the polymer of the present invention. A polymer prepared from a combination of the first matrix component with the second component according to the invention, optionally combined with additional matrix components, is significantly more cost effective as compared to a polymer, based on the second polymer matrix component only. It has been found that the first polymer matrix component, i.e. the leaf sheath material of Arecaceae trees, in particular of *Areca catechu*, significantly contributes to, and is capable of replacing a portion of, the polymer of the second polymer matrix component. Biodegradable polymers, in particular polylactic acid is preferred as second polymer matrix component, as it has surprisingly been found that the home or outdoors biodegradability of biodegradable polymers, in particular of polylactic acid is significantly improved. By blending the leaf sheath material as first component with e.g. polylactic acid, polymeric articles can be obtained that are biodegradable under natural circumstances, therewith avoiding the need for industrial installations with high temperature and high humidity treatment of polylactic acid for decomposition. By blending the polylactic acid with the leaf sheath material, the polymer can easily be decomposed at low costs. Home decomposition and traditional landfill is now possible, and because of the relatively high hemicellulose and lignine content, the polymer is very suitable for biogas formation. The same is true for other biodegradable polymers, such as polyhydroxyalkanoates. For non-biodegradable matrix components, such as PP, PET, etc., blending thereof with the leaf sheath material as first matrix component as defined above, results in a polymer blend of equal or similar quality as compared with the corresponding polymer without the said first matrix component. Interestingly, it has been observed that blending the first matrix component with non-biodegradable polymers such as polypropylene, a novel polymer is obtained where the former non-biodegradable polymers acquire biodegradability.

When both the first and second components are biodegradable, an improved biodegradability can be obtained as compared with the biodegradability of a polymer, prepared from the second polymer matrix component alone.

The weight ratio between the first polymer matrix component and the second component is preferably 5-100:95-0. This means that in a blend, preferably 5 to 100 w/w % is of the first polymer matrix component, and 95-0 w/w % of the second component. However, it should be understood that additional polymer matrix components can be blended as well; in that case, the value for the second polymer matrix component is to be understood as the value for the second and any further polymer matrix components together. It is preferred to use a content as high a possible for the first component. The skilled person will readily be capable to determine the optimal weight ratio between the first polymer matrix component and a second component for the envisaged aim of the polymer blend. To this end, the weight ratio of the first polymer matrix component to the second polymer matrix component is preferably 5-70:95-30, more preferably 10-50:90-10, even more preferably 40-60:60-40. It has been found that the above advantages are pronounced with blends of leaf sheath derived material from *Areca catechu* and polylactic acid having a weight ratio of 50:50 or even higher, i.e. having a higher content of leaf sheath material than polylactic acid.

In another preferred embodiment, the polymer of the invention comprises one or more non-matrix components By incorporating non-matrix components, less matrix component has to be used, therewith lowering the costs, or the polymer can be reinforced, or both. "Non-matrix components" are defined herein as components that do not participate in the polymerization and are not part of the matrix, but are embedded herein. The skilled person is aware of suitable non-matrix components, such as filler or reinforcement materials. In order to provide a biodegradable polymer, the said non-matrix component is biodegradable as well. Other additives can also be incorporated, such as pesticides, fertilizers, or bleaching agents, colouring agents, perfuming agents, torrefied biomass, as will be discussed herebelow.

Any filler and reinforcement material, known in the art and suitable for incorporation in polymers is suited. The skilled person will be capable of choosing among the known fillers and reinforcement materials. The fillers are preferably chosen from the group, consisting of talc, clay, sand, metals such as zinc, aluminium, and the reinforcement materials are preferably chosen from the group consisting of fibres, such as glass fibres, nylon fibres and organic fibres, such as in particular plant fibres, such as fibres of hemp, cenaf, jute, flax, cotton, sisal, coir, coconut and of the husk of the betel nut. The skilled person is aware of suitable materials.

Also fibres of the betel palm *Areca catechu*, such as the husk of the nuts thereof are known as reinforcement material in both synthetic polymers (Srinivasa et al., 2011; Materials and Design 32, pp. 2469-2475) or in biodegradable polymers, such as in polylactic acid (Tao et al., Trans. Nonferrous Met. Soc. China (0001), 19, pp. 651-655).

Non-matrix materials can be present in known polymers in an amount of up to about 20 w/w %. However, it has been shown that the leaf sheath derived material as first polymer matrix component according to the invention can be present in a much higher ratio. It is believed that the thermoplastic properties of the leaf sheath material contributes to this feature, so that much less of the second polymer matrix component has to be used or can even be completely or predominantly replaced by the leaf sheath material. To this end, the polymer preferably comprises at least 20 w/w %, preferably at least 30 w/w %, more preferably at least 40 w/w % of the first polymer matrix component, based on the total weight of the melt.

In another embodiment, the invention provides a method for the preparation of the polymer of the invention, comprising the step of preparing a melt of at least the first polymer matrix component, and, if present, of the second polymer matrix component. It has now been found that the sheath material can be used as matrix material in a polymer. Thereto, the said material is first melted so that a polymeric melt is obtained. This is in sharp contrast with the low temperature processes as described above, where leaf sheath material is pressed using steam into plates or other forms. At such processes, a melt of the sheath material is not obtained. The term 'melt' preferably refers to fully melt material of uniform nature. For thermoplastic polymer matrix material, a melt is obtained at temperatures above the glass transition temperature and/or crystallisation temperature.

In an attractive embodiment, the method of the invention comprises the step of heating the first polymer matrix component, and, if present, of the second polymer matrix component to a temperature of at least 150° C., preferably of at least 160° C. At such a temperature, the leaf sheath material is fully molten and can be further processed as a common polymer, i.e. be subjected to extrusion, injection moulding etc. In case a second or additional polymer matrix material is present, the temperature is preferably chosen such, that the polymer matrix components form a uniform melt wherein all matrix components are molten. The temperature of the melt is preferably 250° C. or less, preferably 230° C. or less, in order to avoid burning of the polymeric melt. However, the optimal temperature range is dictated by the ratio and composition of matrix components, as the skilled person will readily understand.

The said melt is then further processed e.g. by extrusion of injection moulding or any other suitable moulding technique. If present, the second or any additional polymer matrix material is preferably melted together with the first polymeric matrix material (i.e. the leaf sheath material).

Preferably, the first polymer matrix component is provided as particulate, powder or as pellets obtained by pressing the said particulate or powder. The said particulate or powder originates from sheath material of leaves of trees of the genus Arecaceae, in particular of the betel palm *Areca catechu*. The particulate, powder or pellets are used for polymer preparation, e.g. for feeding in an extruder.

The leaf sheaths of trees of the genus Arecaceae, in particular of the betel palm *Areca catechu* are processed into a particulate or powder. The skilled person is aware of techniques how to obtain such a particulate or powder and can use any known cutting and grinding techniques etc. The particulate can be pelletized by common known pelletizing techniques. Pellets are preferably obtained by pressing the particulate and/or powder, under dry conditions i.e. without substantial addition of liquid. The said particulate or powder is preferably obtained by cutting and/or grinding of the leaf sheath material.

Preferably, the particulate, powder or pellets are obtained without any chemical treatment. Although pellets, obtained from the particulate or powder may be treated chemically e.g. with an insecticide, it is very well possible to refrain from any chemical treatment. Although such treatment may involve contacting the particulate, powder or pellets with a liquid, such a liquid is only used to provide the particulate, powder or pellets with the said chemical. Pelletization as such can still be carried out at dry conditions. 'Dry conditions' are herein to be understood that 15 w/w % or less, preferably 10 w/w % or less, more preferably 5 w/w % or less liquid is added to the particulate, powder or pellets. The material is suitable as polymer matrix component without any chemical treatment. To this end, the leaf sheaths are preferably not chemically treated during the particulization process where the particulate and/or powder is formed.

The particulate preferably has a particle size of less than 8 mm, preferably less than 5 mm in order to provide good basic material for the preparation of pellets and for good admixability with any second or further polymer matrix component or non-matrix components. The pellets have a particle size preferably of less than 10 mm, more preferably of less than 8 mm, and preferably of more than 2 mm. The term 'particle size' is herein defined as the size of the particles that pass through a sieve having a mesh size corresponding to the indicated particle size. A particle size of 8 mm therefore reflect the particle size of particles that are sieved through a sieve having a mesh size of 8 mm.

The particulate or the pellets preferably undergo an antimicrobial treatment, such as UV treatment (in particular UV-C treatment) or radioactive irradiation. However, the skilled person is aware of any suitable antimicrobial treatment. Such antimicrobial treatment is important to avoid deterioration of the biological leaf sheath material.

In a very attractive embodiment of the invention, additives can be admixed to the particulate or powder or pellets of the leaf sheath material, which additive can confer an improved quality of the envisaged polymer, or can be compounds that are to be released from the polymer upon the degradation thereof, i.e. to provide for a sustained release article. To this end, the additives are preferably chosen from the group, consisting of pesticides, fertilizers, bleaching agents, colouring agents, perfuming agents, torrefied biomass or a combination of one or more thereof.

The first matrix component can be blended e.g. as particulate with particulate of the second polymer matrix component (if present), or the first and/or second polymer matrix component can be in the form of a melt, to which a particulate or blend of the other component can be admixed. However, in common preparation of techniques, such as extrusion, components are fed in particulate form into the extruder, wherein the particulates are melted.

The invention also provides an article comprising a polymer or a polymer blend from a melt as defined herein. Any article that is suitable to be prepared from polymers are encompassed. In particular, the articles are biodegradable in case the polymer blend is comprised of biodegradable components. All kind of packaging material that would otherwise form waste, can be prepared from the melt as defined herein, such as containers for food products, cosmetics, etcetera, but also for fibre material, e.g. for surgical applications.

The article according to the invention, or prepared by the above method, preferably has a thickness of 0.1-2.0 mm, preferably of 0.4-0.8 mm. In particular when a blend of the leaf sheath material and polylactic acid is used, thin walled material can be produced that is more flexible than similar material, produced from PLA alone, so that single piece articles with hinging portions can be produced, which has not been possible with PLA polymers, that have a limited flexibility. However, articles of any desired thickness can be produced. For extruded articles having a small thickness of 0.1-0.7 mm, preferably low-sized particulate, powder or pellets are used. For articles having a larger thickness, also larger particulate or pellets can be used for the preparation of a melt.

In an attractive embodiment, articles can be produced, such as containers for growth of plants, wherein fertilizers and/or pesticides are incorporated in the polymeric material. During growth of the plant in the said container, the container starts to degrade and the additives are released into the plant growth medium and taken up by the plant. Another advantage is that the plant can be planted into the soil, without removing the plant from the container. The container will gradually decompose during growth of the plant in the soil. To this end, the polymer preferably comprises a blend of at least polylactic acid and the sheath material of leaves of trees of the genus Arecaceae, more preferably of betel palm leaves.

The invention further provides a method for the preparation of an article according to the invention, comprising the steps of:
 a. preparing a melt according to the method according to the invention,
 b. processing the polymeric melt of step a., said processing comprising a step, chosen from the group, consisting of extrusion, moulding, injection moulding, blow moulding or vacuum forming.

According to the invention, a method is provided for the preparation of an article, comprising the step of further processing the polymeric melt as described above, wherein said step preferably comprises any of the above techniques, or any other technique, known for the preparation of plastic articles. It is to be observed that using the first polymer matrix component, in particular in the form of pellets as starting material for the preparation of a polymer, a melt can be obtained that is extrudable and mouldable, which has not been possible before.

In another embodiment, the invention provides a method for the preparation of pellets from leaf sheaths of trees of the genus Arecaceae, comprising the steps of:
   a) providing leaf sheath material from trees of the genus Arecaceae,
   b) particulizing the leaf sheath material of step a) into a particulate or powder,
   c) pelletizing the particulate or powder of step b) into pellets.

As outlined above, such pellets are very suitable as starting material for the preparation of polymers, in particular in extrusion and moulding processes, such as blow moulding and vacuum moulding. As already outlined above, the leaf sheath material is preferably from the betel palm *Areca catechu*. The size of the particulate is preferably less than 8 mm, more preferably less than 5 mm. The pellets have a pellet size of preferably less than 10 mm, more preferably of less than 8 mm, and preferably more than 2 mm.

Step c) is preferably performed at dry conditions, i.e. without the addition of water. It was found that a very well extrudable polymer melt could be obtained, when the particulate and/or powder was pressed to pellets at dry conditions. As explained above, 'dry conditions' still allow addition of 15 w/w % of liquid such as water, but preferably, less than 10 w/w %, more preferably 5 w/w %, more preferably less than 4 w/w %, even more preferably less than 3 w/w %, still even more preferably less than 2 w/w % or less than 1 w/w % and most preferably no water or other liquid is added. The particulate or pellets preferably undergo an antimicrobial treatment, in particular UV treatment (such as UV-C treatment) or radioactive radiation in order to improve the shelf life of the pellets.

Further, one or more additives can be added to the particulate, powder or pellets, such as the above-mentioned pesticides, fertilizers, bleaching agents, colouring agents, perfuming agents, torrefied biomass or a combination of one or more thereof. In particular for injection moulding or extrusion purposes torrefied biomass, or pretreatment of additives by torrefaction is preferred.

Further, the invention relates to the use of pellets as described above for the preparation of a polymer, in particular a polymer of the present invention as described above.

Further, the invention relates to the use of sheath material of leaves of trees of the genus of the Arecaceae, in particular of the betel palm *Areca catechu* as matrix component in the preparation of polymer material and to pellets comprising pressed material of the leaf sheaths of trees of the genus Arecaceae, in particular from *Areca catechu*, as described above.

The invention will now be further exemplified by the following figures and examples.

FIG. 1 shows 2 schematical diagrams of a general leaf anatomy. A leaf blade 3 is held by a tubular sheath 1 around leaf stem 2. Leaves of *Areca catechu* are 1-2 m long, having a pinnate form. The leaves have a tubular sheath at the base around the stem that usually splits open on one side upon maturity.

EXAMPLES

Example 1

Leaf Sheaths of *Areca catechu* and Preparation of Particulate Thereof

Figure 1:
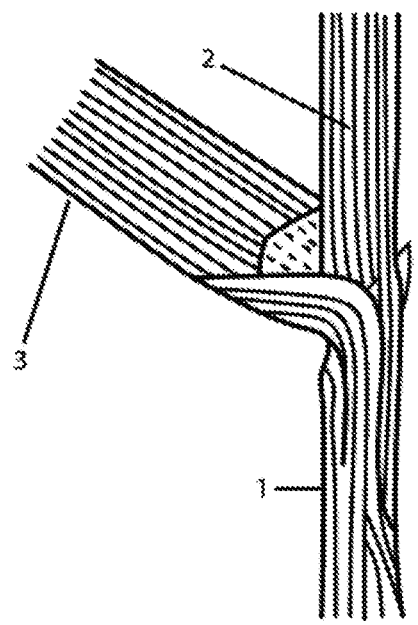
Figure 2A:
FIG. 2A shows collected leafs of the betel palm *Areca catechu*, the leaf sheaths having a white color, whereas the leaf portion is dark.
Figure 2B:
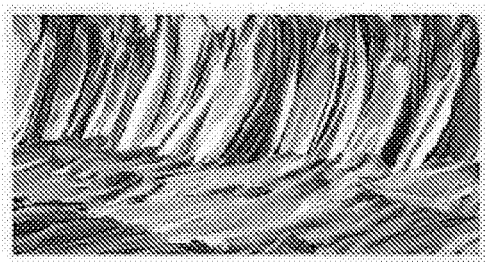
FIG. 2B shows leaf shafts of FIG. 2A, from which the leaf portion has been removed.
Figure 2C:
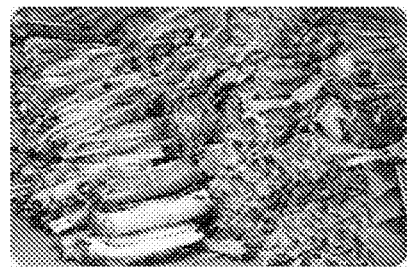
FIG. 2C shows leaf sheaths of FIG. 2B, bound together to piles.

The leafs are cut as shown in FIG. 2A, comprising both the dark-colored leaf and the pale whitish leaf sheath. The leaf sheath of approx. 40-50 cm length is separated from the remaining leaf, preferably by manual cutting at the location where the leafs are collected. Such cut leaf sheaths are shown in FIG. 2B. The sheaths are collected dried and grinded to a particle size of 3-4 mm by a Kotraco GR (V0 30/35 machine, but any suitable grinder, known in the art can be used (Table 1) to the desired particle size. Fresh leaf sheaths could be grinded and further processed as well with similar results. This small relatively grinding machine was operated at 100-180 kg/hour, the equivalent of 750-1.300 leaf sheaths, in a normal non controlled (dust, heat or otherwise) production environment and operates semi-automatic from a bulk sheath feeder.

It was observed that a larger particle size may result in a less smooth dry pelletizing process that may have effect on to the further processing of the material. The size is however not limited to that dimensions and the maximum particle size is defined by dimensions of the holes in the sieve used at grinding, e.g. incorporated in the grinding machine. For thin-walled injection molding purposes (Table 4 IV) the material was e.g. grinded to a maximum particle size of 2 mm (Table 1 sample 5). Via standard conveyor belts the grinded material may pass a UV-C unit like the used T-2011 unit (Table 1 II) that is placed under the conveyor belt over which the grinded particles pass immediately prior to loading in big-bags (vQm Packaging, The Netherlands, bags having a volume of about 0.3-1 $m^3$). The UV-C unit disinfects the surfaces of all particles passing by from bacteria known as Log 5 on the conveyor belt and a minimal of Log 1 for the particles. This purpose can also be accomplished by steam cleaning or the particulate may undergo another sterilization method prior to loading into the big-bags or other bulk means of transportation, if desired. The grinded particularized material can also be further processed like pelletized or powdered right after grinding. Tests with the thus UV-treated particles have shown that no further mold forming occurs for at least a period of 30 days. In order to verify this for further processing we placed samples of the material after grinding as well as after the UV-C treatment in similar conditions.

The UV-C cleaning is intended to prevent early de-composting, as well as bacteriological or biological contaminations (e.g. insects) that might deteriorate the material during storage and shipping.

After filling via any regular conveyor belt that is placed behind the grinder and the UV-C unit, the big-bags are vacuumized to avoid mold growth or early decomposing, therewith extending the shelf live of the grinded material, and stabilizing the moisture content, preventing re-infestation of insects and also allows to add an inert gas to further stabilize the grinded material for long time storage.

The big-bags have been vacuumized using a vacuum flush packaging system (vQm Packaging, The Netherlands) that enables to vacuumize in logistically very efficient square blocks of e.g. 80×120×110 cm to a maximum of 2 MT, where the bags have a membrane fitting on pallets enabling a maximum efficiency in container loading and warehouse storage. The bags preferably have a patented membrane or valve as available from VQM Packaging that allows for controlling as well as adding inert gasses if need be to prevent decomposing, mold forming or other contaminations. These, preferably square, bags can be palletized, shipped and stored in sea containers, in any standard warehousing systems or even outdoors.

To determine bio-degradability and de-composting (Table 1 IV), 3 samples of each (dried processed sheaths and fresh fallen processed sheaths) were put in identical and comparable test. The material placed in water showed an immediate (1-2 days) absorption of water of 10-15% of its own weight after which a material reduction of 90% was observed within a period of 90 days. The materials placed outdoors (south-west Netherlands) showed similar biodegrading or decomposing on the material of approx. 60% weight loss within 40-60 days. Further reduction and loss of weight up to 90% was realized within a time frame of 60-120 days from the start of the tests. The material kept indoors at 20° C. and at approx. 65-70% humidity showed no signs of bio-degrading or decomposing at all during this period.

Example 2

Preparation of Dry Pellets of Leave Sheath Material of *Areca catechu* in a Dry Pelletizing Machine The grinded particulate from Example 1 was fed to a pelletizing machine as known in the art as the LM-772 dry pelletizer having a capacity of 3 MT per day (Table 2 I) and were pressed via a rotary press through a sieve that is forming round pellets of compressed dry sheath particulate. The diameter of the holes in the sieve determines the maximum particle size of the pellets leaving the sieve, but also that of the particle sizes as compressed into the pellets. The chosen diameter preferably varies from 2 to 8 mm for this grinded material offering a wide variety of possibilities for later applications as it reduces significantly the common problems with feeding natural material in extrusion (example 3) or injection molding (example 4) processes. When the diameter of the holes in the sieves of the pelletizing machine are chosen at smaller diameters such as 2 or 3 mm, the grinded particulate has to be pressed longer and/or with more pressure. For thin walled injection molding purposes (Table 4 IV) the material was pelletized to a diameter of 4 mm (Table 1 sample 5).

In this process the particles of example 1 may also be decreased in size up to dust level (1-100 micron similar to e.g. milled flour or milled corn particle sizes) if need be. For thin-walled end-products (as mentioned in example 4 injection molding, see table 4 IV) this pelletizing of dust-sized particles is advantageous. The chosen equipment (Table 2 I) has a construction that prevents the loss of such dust-sized particles so no material is lost during this process. For other products that e.g. require the presence of larger enforcement fibres to strengthen the plastic, a larger particle size for the pellets may be desired.

During the pelletizing one or more additives can be added via a controlled feeding system enabling a wide range of dry or liquid materials to be added to the pellets. These additives can be dry materials or liquids (preferably up to 15 w/w % based on the total weight of the pellets), but this could also be any of the many known fibres from natural sources or industrial sources that are known as a reinforcement or filler material to form a composite with the matrix materials.

During the dry-pelletizing (Table 2 II) a selected variety of materials was added to determine the suitability of the grinded material from example 1 and the ability to further process it in an extrusion or injection molding environment. In order to reduce the natural coloring of the material 5% household bleach (Glorix Thick Bleach, Unilever, the Netherlands) per KG sheath material was added (Table 2 II) during the process resulting in sample 1.1. The thus bleached material enabled a reduction of a white UN0001 color service master batch from 5% with non-bleached grinded particles to 2% bleached grinded particles resulting in a substantial reduction in cost price for "white colored material". White colored plastics are usually very difficult to produce from recycled materials, other than adding up to 10% of a white coloring master batch during injection molding or extrusion. Samples (Table 1 II sample 5) were made adding regular linseed oil as used in feeding horses and cattle as food additive to add more adhesiveness to the dust-sized particles derived from pelletizing for thin walled injection molding purposes. The effect of just 5% of this linseed additive on the dry pelletizing process was that it enabled a 10-15% higher output of material in KG per hour to approx. 3.5 MT per day. In Sample 1.2, 2 w/w % tin powder (SN99%) from LinBraze was added to strengthen the material to "metal like" performances and appearances, this additive had no negative effects on the dry-pelletizing process or the form and substance of the pellet itself, enabling the further use in extrusion or injection molding process, as it melts and blends in at approx. 230° C.

In addition to the above-mentioned additives it was observed that natural bio-based materials, in particular from the region where the pelletizing was performed, such as hemp, kenaf, jute, flax, cotton, sisal or coir but also non-natural materials as glass, nylon, vinyl or other reinforcement fibres that do not blend or mix with the polymer matrix material can be successfully incorporated in the polymer as filler and/or enforcer.

The use of pelletizing prior to further processing (see examples 3 and 4) offers advantageous mixing possibilities of a large variety of materials with new matrix components (e.g. bleaching agents or linseed) still at a dry phase compared to existing methods of dry feeding materials into extrusion of injection molding as this generally leads to clogging in the feeder, the screw/worm or mold, and/or an uneven and unbalanced mixture of the components with existing thermoplastic polymers, or undesired crystallizing of "sugars" inside the tool, causing substantial damages and repair and cleaning costs. Such material can e.g. be pesticides, fertilizers, bleaching agents (Table 2 II sample 1.1, colouring agents (sample 1.1), perfuming agents, fillers or reinforcement material (sample 1.2), torrefied biomass or combinations of two or more thereof (sample 1.1). In the situation where liquids are added It is preferred to add up not more then 15 w/w % per kg (based on the total weight of the pellets) of such materials into the pellets as the dry pellet will not be of consistent structure and fall apart causing a substantial loss of material during the process after the dry pelletizing.

The dry pellets that are produced by this dry-pelletizing machine have a particle size of 6 mm in diameter and 4-8 mm in length and can similar to the grinded material from example 1 be stored in vacuumized big bags as described in example 1 (Table 1 III) after grinding the sheaths and UV-C treatment.

Because of the diameter and length the dry pellets can be processed e.g. in any standard extrusion machine (single or twin screw, example 3) or any injection molding machine (example 4) depending on its further application and the requirements of end product to be injection or thermoform molded.

During a period of 180 days a test was performed to validate the bio-degradability similar to the tests (in water, outdoors and home conditions) performed in example 1 (table 1 IV). There were differences found in example 2 (table 2 V) during that test period as biodegradability was delayed as a result from the compression of the particles in dry pellets in this process. The dimensions of the particles into which the dry pellets were pressed showed no variations in the bio-degradation as measured in loss of weight. The Glorix additive delayed the start of the bio-degradation substantially whereas other additives (example 2 table 2 II) showed no positive or negative effect on the biodegradability of the samples.

Example 3

Extrusion

Preparation of polymerized beads by extrusion using the dry pellets from example 2 and a second polymer matrix component of choice.

The process in example 3, extrusion to produce plastics beads, is ideally suited for large scale bulk production of extruded polymerized beads of e.g. 2×3 mm. that can be distributed world-wide for use as starting material for e.g. injection molding or extrusion processes to produce desired articles.

By extrusion, also other shapes than beads can be produced. Any known suitable extrusion technique can be used in order to produce any desired shape of extruded polymer, such as the above-described beads, rods, plates, etcetera. Plates can e.g. be used in thermoforming processes for the production of e.g. cups, blisters etc.

Dried sheath material and fresh sheath material were grinded and dry pelletized, and fed to KraussMafei KMD 0-25 twin screw extrusion equipment (Table 3 I) to produce regular formed and polymerized standard plastic pellets (Table 3 sample 1.10 and sample 2.10). The same extrusion was done with the dry-pelletized material (Tables 1 and 2 sample 5) for thin walled injection molding purposes (Table 4 IV) of a diameter of approx. 3 mm and length of 2 mm in a continuous process at temperature of 190-230° C. During this process 2% color service master batch UN0001 white (Table 3 II sample 2.10) was added to the non-colored dry-pelletized material with bleaching agent from example 2 (Table 2 II sample 1.1) to color the extruded pellets fully white. The blend used to color was the sample 1.14 and 5.14 made with the least added recycled PLA (Table 3 III). Based on this the conclusion is that other blends and/or the use of virgin (transparent) other plastics would need less coloring master batch.

In view of bio-degradability specific blends were made with Natureworks PLA (Tables 3 III and 6 III) and recycled PLA as sourced from the open trade market (100% recycled PLA, Besstrade, the Netherlands).

Blends of virgin or recycled PLA and grinded sheath material of sample 5:10 (Tables 3 and 2 I, sample 5) without additives were made in weight ratios of 50:50 (samples 1.11, 5.11, 1.13 and 5.13) and of 10:90 (samples 1.12, 5.12, 1.14 and 5.14).

In view of flexible end-product characteristics such as e.g. living hinge possibilities as well as overcoming typical PLA problems with regards to the non-ability to contain hot liquids in cups or other containers, the same blend percentages as for PLA were applied now using virgin PP (SABIC polypropylene) or recycled PP (100% recycled PP, Amorf Kunstoffen, the Netherlands) as second component, see Tables 3 III and 6 III, samples 1.15, 5.15, 1.16, 5.16, 1.17, 5.17, 1.18 and 5.18).

In (Table 3 IV) additional samples were made using both recycled PLA and recycled PP as second and third polymer matrix material respectively with the same dry-pelletized grinded sheath material as first polymer matrix material without additives, samples 1.19, 1.20, 5.19 and 5.20.

All samples were made at the same machine, the same tools and the same machine operator set-up. During a period of up to 360 days a test was performed to validate the bio-degradability similar to the tests conditions and environment as applied for example 1 and 2 (table 1 IV and table 2 V) i.e. fully submerged in water, normal outdoors and home conditions. There were differences found in example 3 (table 3 VI) during that test period as biodegradability of the extruded pellets (example 2 table 4 I) in all test situations (in water and outdoors) was further delayed as a result from the compounding and blending of the dry pellets in this process with the respective virgin and recycled PLA and PP materials (example 2 Table 4 III and IV).

During these tests a difference in bio-degradability as measured in loss of weight was seen with blends made with PLA or with PP, whereas there was no difference noted between virgin or recycled materials for PLA or PP as shown in example 3 table 3 VI). The biodegradability as measured in loss of weight was for the blends made with PP substantially longer then with the blends made with PLA (table 3 VI)

A further difference in bio-degradability was seen when only 10% mixed in PLA or PP (Virgin or recycled) was used or when only 30% recycled PLA and 5% recycled PP was used. The samples with 70-90% of the prepared sheath material showed a similar time frame of bio-degradability as the dry pelletized pellets in both submerged water or outdoors conditions.

The test results allow a skilled compounder to relatively easy determine upfront during the compounding of said materials the desired bio-degradability time frame for the extruded pellets and enables a skilled compounder to blend "tailor-made" towards further applications and usages offering a wide and unique variety in market possibilities and applications.

Most noticeable during the bio-degrading process was that the outside wall structure of the extruded pellets became "rough" at the surface within several days in contrast to the smooth surface finish that standard plastic pellets have. A conclusion could be that this material added to PLA, enables PLA to decompose in a home-biodegradable (oxo-biodegradable) environment instead of the common used industrial biodegradable environment required for PLA (ASTM D6400). All polymerized pellets of all samples made of this new bio-plastic can be shipped and stored identical to generic plastics made, that are currently distributed world-wide to injection molders, sheet extruders or profile extruders in 25 kg bags, 2 MT big bags or silo or any other method.

Furthermore in this process generic or specific coloring can be done, as the sample making with white as referred to in sample 1.1 (Table 2 II) and sample 2.10 (Table 3 II) and showed no differences from known generic plastic applications and usage. Furthermore in example 3 generic blending in other plastics or natural or industrial materials that have not been mixed in during pelletizing to further customize in detail at the injection molder factory to very specific end-product requirements. The tests and the samples show to a significant extent an almost generic plastic like behavior of the processed sheath material.

Example 4

Preparation of Injection Molded Products

Dry pellets derived from process example 2 (Table 1 samples 1 to 5) or the polymerized pellets from example 3 (Table 3 samples 1.10 to 5.20) were fed directly into a common injection molding machine using existing tools for the manufacturing of end-products. The injection molding equipment was programmed (such as with regard to e.g. temperature, pressure, cooling, mold closing etc.) as is common practice in any daily injection molding process with respect to the requirements of the end-product and the plastic material specifics.

The biodegradability and the specifics of the new matrix component offers new possibilities to any injection molder due to the fact that the material from example 3 can be fed into his existing equipment. This offers the possibility to replace easily generic plastics or other materials in products for which it is no problem that it will bio-degrade (products 1), to products for which it is an advantage that they bio-degrade (products 2) through to products that can be newly designed now that they can be molded with a bio-degradable material with the specifics of this new matrix component (products 3).

In Table 4 I and IV samples were made using the material samples from example 3 (Table 3 samples 1.11 to 5.20) for a thick walled product and a newly designed thin walled product.

The thick walled product (Table 4 I) is a flange that is produced normally using ABS 90% and 10% nylon filler on a KMCX250 MT machine.

For sample 1.11 to 1.20 same tool and machine settings were used at 190° C. and a pressure of 1.2 MT.

The product (wall thickness 6 mm) filled completely, with a smooth surface, and a rigid touch and feel of a molded product and operating times were noticeable faster (2-3 s.) then with the ABS-nylon filled production.

The same tests with all samples was done as well as the bio-degrading tests (Table 1 IV, Table 2 V, Table 3 VI) with remarkably no substantial difference in the results.

Placed in water the injection-molded product soaked 10-15% of its own weight, and showed in humid conditions the same biodegrading and decomposing as previously seen. The smooth walls become rough and thinner parts of the injection-molded product can be broken after 30 days.

The thin walled product (Table 4 IV) is a foldable and closeable sim card/smartcard design within ISO/IEC 7816 ID card restrictions.

Wall thickness of the material is 0.76 mm, and 0.24 mm at the position of the embedded chip and temperature demands during usage are from −40 to +85 degrees Celsius for a duration of 4 hours and up to 100 times during its lifecycle.

As this is a typical product 3, a new mold was made that would allow this and other plastic blends to mold a product to the desired requirements. The mold was placed on the same KMCX250 MT machine.

For sample 5.11 to 5.20 we have used the exact same tool and machine settings at 190 degrees Celsius but now with a pressure of 1.4 MT due to the thin walled design and a complete filling.

The product (wall thickness 0.76 with one spot 0.24 mm) filled completely, with a smooth surface, and a rigid touch and feel of a molded product.

The design demanded for a living hinge function and this worked with the samples Table 4 IV 5.15 to 5.20 where virgin or recycled PP was blended in as first or second plastic added. (Table 3 III and IV) The same tests with all samples was done as well as the bio-degrading tests (Table 1 IV, Table 2 V, Table 3 VI with remarkably no substantial difference in the results.

Placed in water the injection-molded product soaked 10-15% of its own weight, and showed in humid conditions the same biodegrading and de-composting as observed for the extruded pellets. The smooth walls of both thick-walled as thin-walled products became rough within a few days and thinner parts of the injection-molded product can be broken after 30 days.

In Table 5 the exact same products (example 4 table 5 1 and IV) were produced but now using 100% Virgin or 100% recycled PLA and or PP for comparative purposes.

During the scope and duration of the test period for example 3 (table 3) and example 4 (table 4) of 360 days a test was performed to validate the bio-degradability similar to the tests conditions and environment as applied for the previous examples i.e. fully submerged in water, normal outdoors and home conditions.

No bio-degradability of any sort or form was noticed under these circumstances for the PP made products. The PLA made products showed a loss of clarity and enlarged brittleness but no significant degradability as measured in weight loss was seen during the entire test period of 360 days. It can therefore be concluded that the polymer matrix component of the invention confers biodegradability (oxo-biodegradability) to non-biodegradable polymer matrix components such as PP, or to materials that are only biodegradable by industrial processes (PLA).

Example 5

Material Characteristics

In Table 6 the different material blends consisting of a 50% PLA or PP mixture and the combined blend with a 30% PLA and 5% PP mixture as produced and tested under Example 3 table 3 III & IV samples were tested according to existing ASTM and ISO test requirements to determine the effect of the various blends on Young's E-Modulus in MPa according to ASTMD790 or ISO 527, Heat Deflection Temperature (HDT) in degrees Celsius according to ASTM D648 or ISO 75, Tensile Elongation Stress in MPa according to ASTM D638 or ISO 527 and Notched Izod impact test in J/m2 according to ASTM D256 or ISO 180 test specifications as commonly used and known in the art.

As a reference indicators these values were also taken from the datasheet of the virgin PLA material from Natureworks Ingeo 3251D and the Virgin PP material from Sabic 575P.

The recycled PLA and PP were also tested without additives or admixes for reference.

The used blends for testing were of 50% *areca* sheath material (sheath fiber) and respectively 50% virgin and recycled PLA, 50% virgin and recycled PP and a special blend of 30% recycled PLA and 5% recycled PP and 65% *areca* sheath material (fiber).

The improvement in material characteristics from both the virgin material as well as the recycled material if blended with 50% *areca* sheath fiber material prepared in example 4 showed to be almost identical if measured in a percentual increase as compared to the original values of the single PLA or PP material be it virgin or recycled.

The E-Modulus or elastic modulus refers to the degree of stiffness of an elastic material. The increase shows a strong 70% increase as compared to both applied PLA materials and almost 75% for both applied PP materials. Especially remarkable and interesting for future applications is the combination with a strong increase in HDT values of almost 35% for both applied PP materials and the 15-20% increase in Tensile Stress and a 30-35% increase in the notched impact results of all the samples.

The materials characteristics data reflect that the specific characteristics of the *areca* sheath material are maintained throughout the process and improve existing thermoplastics such as PLA or PP.

These test results further positions the blends with 50% *Areca* fiber in the range of common thermoplastics (like PP) and engineering thermoplastics (like ABS) as presented in a typical Ashby chart by Grantadesign (Ashbydiagram Strength—Max. Service Temperature, available via www.grantadesign.com) wherein tensile strength is plotted against service temperature for which HDT is a common indicator. The remarkable HDT test results in combination with the E-Modulus and tensile strength for the 50% blend with PP defines this specific blend as a high end so called "engineering plastic" as defined by a HDT range from 100-150° C. as compared to standard plastics as defined by a HDT range up to 100° C. such as PP. This is especially remarkable for a blend based on bio materials and especially so as it introduces a bio-degradable engineering plastic suitable for thermoplastics that need to perform at higher temperatures.

The samples 1.19 and 5.19 (30% recycled PLA and 5% recycled PP) that were tested showed a strong E modulus increase from virgin or recycled PP but a small value from virgin or recycled PLA. It was found remarkable that the HDT increased strongly as was seen from the 50% PP blends whereas Tensile Stress and Notched Impact remained almost unchanged as compared to the data for material characteristics for virgin or recycled PLA.

The examples 1 to 5 and the samples made 1.11 to 5.20 offer substantial proof that with this sheath based material all injection molding companies, using existing injection molding manufacturing process with no need for further investments in equipment or tools with the exclusion of newly designed products 3 can find an application for this material from example 3 (extrusion to plastic pellets).

Significant advantages are in one-way applications of typical end-products and or end-products that end in forms of bio-gas winning processes due to the specific and relative high celluloses percentages contained in the material.

A wide variety of studies and tests show that large concentrations of hemi-cellulose act as an "accelerator" in these process producing quicker and more bio-gas at the same temperature the bio-mass is heated at, or reducing the temperature that is needed to externally heat the bio-mass.

Examples of products for which bio-degradability is no requirement but it is no limitation either" can be found in e.g. in construction where all sort of clips that hold metal wiring for concrete strengthening or insulation materials, tree binders for young and newly planted trees, all sorts of seasonal components that are only used a short period such as clips, holders, cups, plates & cutlery, panels, separators, insulation, foils, etc.

Examples of products for which bio-degradability has advantages are for major usage foreseen in one-way packaging in general for any market or product market application (cosmetics, media, electronics, food, medical etc). Immediate and easy application can be made e.g. in packaging of plants & flowers. These plant containers are now molded from generic and recycled plastics to reduce cost price.

The usage of the new matrix component for these type of applications offers added plant nutrition advantages for soils with poor nutrition from its own as it de-composts, as well as the possibility to add pesticides. Immediate and easy application can be realized as well e.g. in the packaging of mushrooms, tomatoes, lettuce and other fruits or vegetables that require cleaning at home and are now packed on Styrofoam trays.

In addition, the novel matrix component can also be used in combination with existing materials and processes for certain expanded foam applications (EPS) such as packaging & protection of electronics and home appliances (cookers, dishwashers, stereo sets, mobile phones etc) as examples of products for which bio-degradability is part of the design form & function. This allows product designers, toolmakers and injection molders to actually design and produce "plastic" products where the life cycle of the product is combined or complemented with the choice of material that now enables products (end-products, components, packaging, decoration, etc.) to be purchased by consumers where the product ends it life-cycle in home composting or home bio-mass material, energy or soil fertilizers or in the mass "green-material" waste management systems widely available around the world.

TABLE 1

| | | Table 1 Example 1 | | | |
|---|---|---|---|---|---|
| | GRINDING | machine GR(V) 30/35 | sample 1 | sample 3 | Sample 5 |
| I | | sieve for particle size max in mm | 4 | 4 | 2 |
| II | UV-C treated | T-2011 conveyor belt unit log5-log1 | no | no | yes |
| III | vacuumised packaging | AudionVac VMS 113 after UV treated mold forming | no | no | no |
| IV | bio-degrading | in water 90% reduced <90 days | yes | yes | Yes |
| | | Outdoor conditions 60% reduced | yes | yes | yes |

TABLE 1-continued

Table 1
Example 1

| GRINDING | machine GR(V) 30/35 | sample 1 | sample 3 | Sample 5 |
|---|---|---|---|---|
| | Duration in days | 40-60 | 40-60 | 40-60 |
| | Outdoor conditions 90% reduced | yes | yes | yes |
| | duration in days | 60-120 | 60-120 | 60-120 |
| | Indoor/home conditions reduced | No | No | No |

TABLE 2

Table 2
Example 2

| | DRY PELLETISING | machine LM-772 | sample 1 | sample 2 | sample 1.1 | sample 1.2 | Sample 5 |
|---|---|---|---|---|---|---|---|
| I | pelletdimensions | diameter in mm | 8 | 8 | | | 4 |
| | | length in mm | 10-35 | 10-35 | | | 10-25 |
| | | duration in minutes | cont | cont | | | cont |
| | | temperature in degrees Celsius | room | room | | | room |
| II | additives | Glorix home appliance bleach in % | — | — | 5 | — | — |
| | | UN-TR Colorservice MB % to white | — | 5 | 2 | — | — |
| | | metal powder (ie tin powder) in % | — | — | — | 2 | — |
| | | generic linseed oil for horses in % | — | — | — | — | 5 |
| III | UV-C treated | T-2011 conveyor belt unit (log5-log1) | yes | yes | yes | yes | yes |
| IV | Vacuumised packing | AudionVac VMS 113 | no | no | no | no | no |
| | | after UV treated mold forming | | | | | |
| V | bio-degrading | in water 90% reduced <90 days | yes | yes | yes | yes | yes |
| | | Outdoor conditions 60% reduced | Yes | Yes | Yes | Yes | Yes |
| | | Duration in days | 60-90 | 60-90 | 90-120 | 60-90 | 60-90 |
| | | Outdoor conditions 90% reduced | Yes | Yes | No | Yes | Yes |
| | | Duration in days | 90-120 | 90-120 | 120-180 | 90-120 | 90-120 |
| | | Indoor/home conditions reduced | No | No | No | No | No |

TABLE 3

Table 3
Example 3

| | EXTRUSION PELLETISING | KMD 90-26//WPC twin screw | sample 1.10 | sample 2.10 | sample 5.10 |
|---|---|---|---|---|---|
| I | pelletdimensions | diameter in mm | 3 | 3 | 3 |
| | | length in mm | 2 | 2 | 2 |
| | | duration in minutes | cont | cont | cont |
| | | temperature in degrees Celsius | 190-220 | 190-220 | 190-220 |
| | | cooling of pellets in minutes | cont | cont | cont |
| II | additives | UN-TR Colorservice MB % to white | — | 2 | — |
| | | metal powder (ie tin powder) in % | — | — | — |

| | | | sample 1.11 sample 5.11 | sample 1.12 sample 5.12 | sample 1.13 sample 5.13 | sample 1.14 sample 5.14 | sample 1.15 sample 5.15 | sample 1.16 sample 5.16 |
|---|---|---|---|---|---|---|---|---|
| III | 1st other plastic added | Virgin PLA in % mixed in | 50 | 10 | | | | |
| | | recycled PLA % mixed in | — | — | 50 | 10 | | |
| | | Virgin PP in % mixed in | — | — | — | — | 50 | 10 |
| | | Recycled PP in % mixed in | — | — | — | — | — | — |
| IV | 2nd other plastic added | Recycled PLA in % mixed in | — | — | — | — | — | — |
| | | Recycled PP in % mixed in | — | — | — | — | — | — |
| V | Vacuumised packing | AudioVac VMS 113 | no | no | no | no | no | no |
| | | after UV treated mold forming | | | | | | |
| VI | bio-degrading | In water 60% reduced <90 days | Yes | yes | Yes | yes | no | yes |
| | | In water 90% reduced <90 days | no | Yes | no | Yes | no | Yes |
| | | In water 90% reduced <180 days | yes | — | yes | — | yes | — |
| | | Outdoor conditions 60% reduced | Yes | Yes | Yes | Yes | Yes | Yes |
| | | duration in days | 90-120 | 60-90 | 90-120 | 60-90 | 120-180 | 60-90 |
| | | Outdoor conditions 90% reduced | Yes | Yes | Yes | Yes | Yes | Yes |
| | | duration in days | 120-180 | 90-120 | 120-180 | 90-120 | 240-360 | 90-120 |
| | | Indoor/home conditions reduced | no | no | no | no | no | no |

TABLE 3-continued

Table 3
Example 3

| | | EXTRUSION PELLETISING | KMD 90-26//WPC twin screw | | | | |
|---|---|---|---|---|---|---|---|
| | I | pelletdimensions | diameter in mm | | | | |
| | | | length in mm | | | | |
| | | | duration in minutes | | | | |
| | | | temperature in degrees Celsius | | | | |
| | | | cooling of pellets in minutes | | | | |
| | II | additives | UN-TR Colorservice MB % to white | | | | |
| | | | metal powder (ie tin powder) in % | | | | |

| | | | | sample 1.17 sample 5.17 | sample 1.18 sample 5.18 | sample 1.19 sample 5.19 | sample 1.20 sample 5.20 |
|---|---|---|---|---|---|---|---|
| | III | 1st other plastic added | Virgin PLA in % mixed in | | | | |
| | | | recycled PLA % mixed in | | | | |
| | | | Virgin PP in % mixed in | | | | |
| | | | Recycled PP in % mixed in | 50 | 10 | | |
| | IV | 2nd other plastic added | Recycled PLA in % mixed in | — | — | 30 | 10 |
| | | | Recycled PP in % mixed in | — | — | 5 | 5 |
| | V | Vacuumised packing | AudioVac VMS 113 | no | no | no | no |
| | | | after UV treated mold forming | | | | |
| | VI | bio-degrading | In water 60% reduced <90 days | no | yes | Yes | yes |
| | | | In water 90% reduced <90 days | no | Yes | no | Yes |
| | | | In water 90% reduced <180 days | yes | — | yes | — |
| | | | Outdoor conditions 60% reduced | Yes | Yes | Yes | Yes |
| | | | duration in days | 120-180 | 60-90 | 60-90 | 60-90 |
| | | | Outdoor conditions 90% reduced | Yes | Yes | Yes | Yes |
| | | | duration in days | 240-360 | 90-120 | 120-180 | 90-120 |
| | | | Indoor/home conditions reduced | no | no | no | no |

TABLE 4

Table 4
Example 4

| | INJECTION MOLDING | machine KM CX250 MT | sample 1.11 | sample 1.12 | sample 1.13 | sample 1.14 | sample 1.15 | sample 1.16 |
|---|---|---|---|---|---|---|---|---|
| I | thickwalled component | tool "technical connector flange" heat at in degrees Celsius | 190 | 190 | 190 | 190 | 190 | 190 |
| | | pressure in MT | 1.2 | 1.2 | 1.2 | 1.2 | 1.2 | 1.2 |
| | | wall thickness in mm | 6 | 6 | 6 | 6 | 6 | 6 |
| II | additives | UN-TR Colorservice MB % to white | no | no | no | no | no | no |
| | | metal powder (ie tin powder) in % | no | no | no | no | no | no |
| | | other plastic | no | no | no | no | no | no |
| III | bio-degrading | In water 60% reduced <90 days | Yes | yes | Yes | yes | no | yes |
| | | In water 90% reduced <90 days | no | Yes | no | Yes | no | Yes |
| | | In water 90% reduced <180 days | yes | — | yes | — | yes | — |
| | | Outdoor composting 60% reduced | Yes | Yes | Yes | Yes | Yes | Yes |
| | | duration in days | 90-120 | 60-90 | 90-120 | 60-90 | 120-180 | 60-90 |
| | | Outdoors composting 90% reduced | Yes | Yes | Yes | Yes | Yes | Yes |
| | | duration in days | 120-180 | 90-120 | 120-180 | 90-120 | 240-360 | 90-120 |
| | | Indoor/home conditions reduced | no | no | no | no | no | no |
| | | | sample 5.11 | sample 5.12 | sample 5.13 | sample 5.14 | sample 5.15 | sample 5.16 |
| IV | thinwalled component | tool "cardpack" heat at in degrees Celsius | 190 | 190 | 190 | 190 | 190 | 190 |
| | | pressure in MT | 1.4 | 1.4 | 1.4 | 1.4 | 1.4 | 1.4 |
| | | wall thickness ISO/IEC 7816 ID card in mm | 0.76 | 0.76 | 0.76 | 0.76 | 0.76 | 0.76 |
| | | wall thickness at chip location in mm | 0.24 | 0.24 | 0.24 | 0.24 | 0.24 | 0.24 |
| V | additives | UN-TR Colorservice MB % to white | no | no | no | no | no | no |
| | | metal powder (ie tin powder) in % | no | no | no | no | no | no |
| VI | bio-degrading | In water 60% reduced <90 days | Yes | yes | Yes | yes | no | yes |
| | | In water 90% reduced <90 days | no | Yes | no | Yes | no | Yes |

TABLE 4-continued

Table 4
Example 4

| | | | | | | | |
|---|---|---|---|---|---|---|---|
| In water 90% reduced <150 days | | yes | — | yes | — | yes | — |
| Outdoor composting 60% reduced | | Yes | Yes | Yes | Yes | Yes | Yes |
| duration in days | | 90-180 | 60-90 | 90-120 | 60-90 | 120-180 | 60-90 |
| Outdoors composting 90% reduced | | Yes | Yes | Yes | Yes | Yes | Yes |
| duration in days | | 120-180 | 90-120 | 120-180 | 90-120 | 240-360 | 90-120 |
| Indoor/home conditions reduced | | no | no | no | no | no | no |

| | | INJECTION MOLDING | machine KM CX250 MT | sample 1.17 | sample 1.18 | sample 1.19 | sample 1.20 |
|---|---|---|---|---|---|---|---|
| I | thickwalled component | | tool "technical connector flange" heat at in degrees Celsius | 190 | 190 | 190 | 190 |
| | | | pressure in MT | 1.2 | 1.2 | 1.2 | 1.2 |
| | | | wall thickness in mm | 6 | 6 | 6 | 6 |
| II | additives | | UN-TR Colorservice MB % to white | no | no | no | no |
| | | | metal powder (ie tin powder) in % | no | no | no | no |
| | | | other plastic | no | no | no | no |
| III | bio-degrading | | In water 60% reduced <90 days | no | yes | Yes | yes |
| | | | In water 90% reduced <90 days | no | Yes | no | Yes |
| | | | In water 90% reduced <180 days | yes | — | yes | — |
| | | | Outdoor composting 60% reduced | Yes | Yes | Yes | Yes |
| | | | duration in days | 120-180 | 60-90 | 60-90 | 60-90 |
| | | | Outdoors composting 90% reduced | Yes | Yes | Yes | Yes |
| | | | duration in days | 240-360 | 90-120 | 120-180 | 90-120 |
| | | | Indoor/home conditions reduced | no | no | no | no |

| | | | | sample 5.17 | sample 5.18 | sample 5.19 | sample 5.20 |
|---|---|---|---|---|---|---|---|
| IV | thinwalled component | | tool "cardpack" heat at in degrees Celsius | 190 | 190 | 190 | 190 |
| | | | pressure in MT | 1.4 | 1.4 | 1.4 | 1.4 |
| | | | wall thickness ISO/IEC 7816 ID card in mm | 0.76 | 0.76 | 0.76 | 0.76 |
| | | | wall thickness at chip location in mm | 0.24 | 0.24 | 0.24 | 0.24 |
| V | additives | | UN-TR Colorservice MB % to white | no | no | no | no |
| | | | metal powder (ie tin powder) in % | no | no | no | no |
| VI | bio-degrading | | In water 60% reduced <90 days | no | yes | Yes | yes |
| | | | In water 90% reduced <90 days | no | Yes | no | Yes |
| | | | In water 90% reduced <150 days | yes | — | yes | — |
| | | | Outdoor composting 60% reduced | Yes | Yes | Yes | Yes |
| | | | duration in days | 120-180 | 60-90 | 60-90 | 60-90 |
| | | | Outdoors composting 90% reduced | Yes | Yes | Yes | Yes |
| | | | duration in days | 240-360 | 90-120 | 120-180 | 90-120 |
| | | | Indoor/home conditions reduced | no | no | no | no |

TABLE 5

Table 5
Example5

| | INJECTION MOLDING | machine KM CX250 MT | Virgin PLA Ingeo 3251D | Recyled PLA | Virgin PP Sabic 575P | Recycled PP |
|---|---|---|---|---|---|---|
| I | thickwalled component | tool "technical connector flange" heat in degrees Celsius | 190 | 190 | 190 | 190 |
| | | pressure in MT | 1.2 | 1.2 | 1.2 | 1.2 |
| | | wall thickness in mm | 6 | 6 | 6 | 6 |
| II | additives | UN-TR Color service MB % to white | no | no | no | no |
| | | metal powder (ie tin powder) in % | no | no | no | no |
| | | other plastic | no | no | no | no |
| III | bio-degrading | In water 60% reduced <90 days | no | no | no | no |
| | | In water 90% reduced <180 days | no | no | no | no |
| | | Outdoor composting 60% reduced | no | no | yes | yes |
| | | duration in years | 1 | 1 | >100 | >100 |
| | | Outdoors composting 90% reduced | yes | yes | yes | yes |
| | | duration in years | 1-2 | 1-2 | >100 | >100 |
| | | Indoor/home conditions reduced | no | no | no | no |

TABLE 5-continued

Table 5
Example5

|  |  |  | sample 5.11 | sample 5.12 | sample 5.13 | sample 5.14 |
|---|---|---|---|---|---|---|
| IV | thinwalled component | tool "cardpack" | 190 | 190 | 190 | 190 |
|  |  | heat in degrees Celsius |  |  |  |  |
|  |  | pressure in MT | 1.4 | 1.4 | 1.4 | 1.4 |
|  |  | wall thickness ISO/IEC 7816 ID card in mm | 0.76 | 0.76 | 0.76 | 0.76 |
|  |  | wall thickness at chip location in mm | 0.24 | 0.24 | 0.24 | 0.24 |
| V | additives | UN-TR Color service MB % to white | no | no | no | no |
|  |  | metal powder (ie tin powder) in % | no | no | no | no |
| VI | bio-degrading | In water 60% reduced <90 days | no | no | no | no |
|  |  | In water 90% reduced <180 days | no | no | no | no |
|  |  | Outdoor composting 50% reduced | no | no | yes | yes |
|  |  | duration in days | 1 | 1 | >100 | >100 |
|  |  | Outdoor composting 90% reduced | yes | yes | yes | yes |
|  |  | duration in days | 1-2 | 1-2 | >100 | >100 |
|  |  | Indoor/home conditions reduced | no | no | no | no |

TABLE 6

Table 6
Example 6

| Material Characteristics |  |  | sample 1.11 sample 5.11 | sample 1.13 sample 5.13 | sample 1.15 sample 5.15 | sample 1.17 sample 5.17 | sample 1.19 sample 5.19 |
|---|---|---|---|---|---|---|---|
| I | 1st other plastic added | Virgin PLA in % mixed in | 50 | — | — | — |  |
|  |  | recycled PLA in % mixed in | — | 50 | — | — |  |
|  |  | Virgin PP in % mixed in | — | — | 50 | — |  |
|  |  | Recycled PP in % mixed in | — | — | — | 50 |  |
| II | 2nd other plastic added | Recycled PLA in % mixed in | — | — | — | — | 30 |
|  |  | Recycled PP in % mixed in | — | — | — | — | 5 |
| III | Material Specifications ASTM/ISO | ϵ-Modulus (MPa) D790/527 | 5900 | 5250 | 2800 | 1650 | 4600 |
|  |  | HDT (Celsius) D648/75 | 75 | 72 | 132 | 105 | 68 |
|  |  | Tensile Stress (MPa) D638/527 | 74 | 67 | 46 | 38 | 60 |
|  |  | Izod Imp. notch (J/m2) D256/180 | 22 | 19 | 30 | 21 | 18 |

| Material Characteristics |  |  | Virgin PLA Ingeo 3251D | Recyled PlA | Virgin PP Sabic 575P | Recycled PP |
|---|---|---|---|---|---|---|
| I | 1st other plastic added | Virgin PLA in % mixed in |  |  |  |  |
|  |  | recycled PLA in % mixed in |  |  |  |  |
|  |  | Virgin PP in % mixed in |  |  |  |  |
|  |  | Recycled PP in % mixed in |  |  |  |  |
| II | 2nd other plastic added | Recycled PLA in % mixed in |  |  |  |  |
|  |  | Recycled PP in % mixed in |  |  |  |  |
| III | Material Specifications ASTM/ISO | ϵ-Modulus (MPa) D790/527 | 3500 | 2690 | 1600 | 1360 |
|  |  | HDT (Celsius) D648/75 | 55 | 51 | 98 | 55 |
|  |  | Tensile Stress (MPa) D638/527 | 62 | 57 | 35 | 28 |
|  |  | Izod Imp. notch (J/m2) D256/180 | 16 | 12 | 22 | 5 |

The invention claimed is:

1. A method for the preparation of a polymer article, comprising the step of preparing a melt of at least a first polymer matrix component and a second polymer matrix component, the first polymer matrix component being material derived from the leaf sheaths of trees of the betel palm *Areca catechu*, the second polymer matrix component comprising a thermoplastic polymer, said step of preparing the melt comprises heating the first polymer matrix component and the second polymer matrix component to a temperature of at least 150° C.

2. The method of claim 1, wherein the thermoplastic polymer is chosen from the group, consisting of PLA, PHA, PP, PET, PVC, PS, PC, PV, ABS or a mixture of two or more thereof.

3. The method of claim 2, wherein the thermoplastic polymer comprises PLA.

4. The method of claim 1, wherein the temperature is 250° C. or less.

5. The method of claim 1, wherein the wherein the weight ratio of the first polymer matrix component to the second polymer matrix component is 5-70:95-30.

6. The method of claim 1, wherein the wherein the weight ratio of the first polymer matrix component to the second polymer matrix component is 40-60:60-40.

7. The method of claim 1, further comprising incorporating one or more non-matrix components, chosen from the group, consisting of fillers, reinforcement materials, pesticides, fertilizers, bleaching agents, colouring agents, perfuming agents, torrefied biomass or a combination of two or more thereof.

8. The method of claim 7, wherein the reinforcement material comprise organic fibres from the husk of the nuts of *Arecha catechu*.

9. The method of claim 1, wherein the first polymer matrix component is provided as particulate; powder; or as pellets obtained by pressing the said particulate and/or powder.

10. The method of claim 9, wherein the pellets have a particle size of less than 10 mm.

11. The method of claim 9, further comprising an antimicrobial treatment of the particulate or pellets before preparation of the melt.

12. The method of 9, further comprising admixing one or more additives to the particulate, powder or pellets.

13. The method of claim 2, wherein the additive is chosen from the group, consisting of pesticides, fertilizers, bleaching agents, colouring agents, perfuming agents, torrefied biomass or a combination of one or more thereof.

14. The method of claim 1, further comprising processing the said polymeric melt by extrusion, moulding, injection moulding, blow moulding or vacuum forming.

15. A polymer article, obtained by the method of claim 1.

16. The polymer article of claim 15, comprising at least 20 w/w %, related to the total weight of the polymer, of the first polymer matrix material.

17. The polymer article of claim 15, comprising at least 40 w/w %, related to the total weight of the polymer, of the first polymer matrix material.

18. A polymer article, obtained by the method of claim 14.

19. The polymer article of claim 18, comprising at least 20 w/w %, related to the total weight of the polymer, of the first polymer matrix material.

20. The polymer article of claim 18, wherein the article has at least locally a thickness of 0.1-2.0 mm.

* * * * *